(12) United States Patent
Imazawa et al.

(10) Patent No.: US 10,951,069 B1
(45) Date of Patent: Mar. 16, 2021

(54) CONTACTLESS POWER SUPPLY DEVICE AND TRANSMITTER DEVICE

(71) Applicant: OMRON Corporation, Kyoto (JP)

(72) Inventors: Takanori Imazawa, Ichinomiya (JP); Goro Nakao, Inazawa (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/934,683

(22) Filed: Jul. 21, 2020

(30) Foreign Application Priority Data

Aug. 28, 2019 (JP) .............................. JP2019-156003

(51) Int. Cl.
*H02J 50/12* (2016.01)
*H02J 50/80* (2016.01)
*H02M 7/5387* (2007.01)

(52) U.S. Cl.
CPC .............. *H02J 50/12* (2016.02); *H02J 50/80* (2016.02); *H02M 7/5387* (2013.01)

(58) Field of Classification Search
CPC ............ H02J 50/10; H02J 50/12; H02J 50/80; H02M 7/5387
USPC ....................................................... 307/104
See application file for complete search history.

(56) References Cited

U.S. PATENT DOCUMENTS

2016/0285278 A1* 9/2016 Mehas .................... H02J 50/12
2017/0149285 A1   5/2017 Ushijima et al.
2017/0279310 A1* 9/2017 Ii ............................ H02J 50/80

FOREIGN PATENT DOCUMENTS

WO       2015173850 A1    11/2015

* cited by examiner

*Primary Examiner* — William Hernandez
(74) *Attorney, Agent, or Firm* — Metrolex IP Law Group, PLLC

(57) ABSTRACT

A contactless power supply device includes: a power transmitter, and a power receiver configured to accept a power transmission from the power transmitter without contact; the power transmitter including a transmitter coil for supplying power to the power receiver via a receiver coil in the power receiver; a power supply circuit including a power source configured to supply direct-current power, and a plurality of switching elements connected in a full-bridge or half-bridge configuration between the power source and the transmitter coil; the plurality of switching elements switching between on and off states at a predetermined frequency to thereby convert the direct-current power supplied by the power source into alternating-current power of a predetermined frequency which is supplied to the transmitter coil; an auxiliary coil arranged to be capable of electromagnetic coupling with the transmitter coil; and a capacitive element configured for connection to the auxiliary coil.

11 Claims, 6 Drawing Sheets

CONTACTLESS POWER SUPPLY DEVICE AND TRANSMITTER DEVICE

CROSS-REFERENCE TO RELATED APPLICATIONS

This application claims the priority of Japanese Patent Application Number 2019-156003 filed on Aug. 28, 2019 which is hereby incorporated by reference.

FIELD

The disclosure relates to a contactless power supply device, and to a power transmitter can be used in a contactless power supply device.

BACKGROUND

Methods known for transmitting power through the air without relying on metal contacts or the like, i.e., contactless power supply (also known as wireless power supply) have been the subject of research.

In one example of such a method of contactless power supply technology, only a secondary (receiver) coil is made up of a resonant circuit. The phase information for the resonant current flowing through the resonant circuit is detected, the drive frequency of a primary (transmitter) coil is defined on the basis of the phase information so that the current phase of the drive current flowing through the primary coil is slightly delayed from the voltage phase, and the primary coil driven with this drive current (see for instance, International Publication Number 2015/173850). A Q factor, defined by equal load resistance between the leak inductance of the secondary coil and the capacitance of the resonant capacitor, is established as a value at or equal to $Q=2/k^2$ (where k is a coupling coefficient). This feature minimizes heating in the primary coil and ensures that a frequency most suitable for power rate of the primary coil is automatically selected as the drive frequency. The configuration also reduces both copper loss and switching loss.

Technical Problem

However, the above mentioned features requires higher Q factors in order to establish a suitable drive frequency. The inductance of the receiver-side coil must increase in order to increase the Q factor, and to do that requires a larger receiver-side coil. As a result, the footprint of the overall device increases.

Therefore, to address the foregoing, embodiments provide a contactless power supply device that is capable of improving the power transmission efficiency thereof via a simple configuration.

SUMMARY

One embodiment provides a contactless power supply device including a power transmitter, and a power receiver configured to accept a power transmission from the power transmitter without contact. The power transmitter in the contactless power supply device includes: a transmitter coil for supplying power to the power receiver via a receiver coil in the power receiver; a power supply circuit including a power source configured to supply direct-current power, and plurality of switching elements connected in a full-bridge or half-bridge configuration between the power source and the transmitter coil; the plurality of switching elements switching between on and off states at a predetermined frequency to thereby convert the direct-current power supplied by the power source into alternating-current power of a predetermined frequency which is supplied to the transmitter coil; an auxiliary coil arranged to allow for electromagnetic coupling with the transmitter coil; and a capacitive element configured for connection to the auxiliary coil. A contactless power supply device thusly configured is capable of improving the power transmission efficiency thereof via a simple configuration.

The coupling coefficient between the transmitter coil and the auxiliary coil in the contactless power supply device is greater than the maximum value expected as the coupling coefficient between the transmitter coil and the receiver coil. A contactless power supply device thusly configured facilitates establishing an amount of delay that is suitable for the phase of the current flowing in the switching elements with respect to the phase of the voltage applied to the switching elements in the power supply circuit; consequently, this reduces the switching loss in the switching elements.

The capacitive element in the power transmitter may be configured to allow adjustment of the electrostatic charge therein in the contactless power supply device. The power transmitter may further include: a current detection circuit for obtaining a measurement value for the amount of current flowing in any of the plurality of switching elements in the power supply circuit; and a control circuit configured to control the electrostatic charge in the capacitive element in accordance with the measurement value for the amount of current when any one of the plurality of switching elements in the power supply circuit is turned off. A contactless power supply device thusly configured is capable of controlling the amount of delay for the phase of the current flowing in the switching elements that is suitable with respect to the phase of the voltage applied to the switching elements in the power supply circuit even when the coupling coefficient between the transmitter coil and the receiver coil varies. Therefore, the contactless power supply device is capable of reducing the switching loss in the switching elements.

In this case, the control circuit in the power transmitter may control the capacitive element to cause the electrostatic charge in the capacitive element to increase when the measurement value for the amount of current when any of the plurality of switching elements in the power supply circuit is turned off exceeds a predetermined upper limit threshold. The contactless power supply device is thus capable of minimizing the peak value of the current flowing in a switching element in the power supply circuit when the switching element is turned off, and is therefore capable of reducing the switching loss in the switching elements.

The control circuit may further control the capacitive element to cause the electrostatic charge in the capacitive element to decrease when the measurement value for the amount of current when any one of the plurality of switching elements in the power supply circuit is turned off is less than a predetermined lower limit threshold that is lower than the predetermined upper limit threshold. The contactless power supply device is thus capable of preventing an excess increase in the RMS value of the current flowing in the auxiliary coil and reduce the conduction loss from the current flowing in the auxiliary coil.

Alternatively, the capacitive element in the power transmitter may be configured to allow adjustment of the electrostatic charge therein in the contactless power supply device. The power transmitter may further include: a current detection circuit for obtaining a measurement value for the amount of current flowing in the auxiliary coil; and a control circuit configured to control the electrostatic charge in the capacitive element in accordance with the measurement value for the amount of current when any one of the plurality of switching elements in the power supply circuit is turned off. A contactless power supply device thusly configured is capable of controlling the amount of delay for the phase of the current flowing in the switching elements that is suitable with respect to the phase of the voltage applied to the switching elements in the power supply circuit even when the coupling coefficient between the transmitter coil and the receiver coil varies. Therefore, the contactless power supply device is capable of reducing the switching loss in the switching elements.

Another embodiment provides a power transmitter configured for transmitting power to a power receiver without contact. The power transmitter includes a transmitter coil for supplying power to the power receiver via a receiver coil in the power receiver; a power supply circuit including a plurality of switching elements connected in a full-bridge or half-bridge configuration between a power source for supplying direct-current power and the transmitter coil; the plurality of switching elements switching between on and off states at a predetermined frequency to thereby convert the direct-current power supplied by the power source into alternating-current power of a predetermined frequency which is supplied to the transmitter coil; an auxiliary coil arranged to allow for electromagnetic coupling with the transmitter coil; and a capacitive element configured for connection to the auxiliary coil. A power transmitter thusly configured is capable of improving the power transmission efficiency thereof via a simple configuration.

DETAILED DESCRIPTION

A contactless power supply device according to an embodiment is described below with reference to the drawings. A contactless power supply device according to an embodiment has a device on the power transmitting side (referred to below as simply a power transmitter device) which includes a coil used for power transmission (referred to below as a transmitter coil), an auxiliary coil provided capable of electromagnetic coupling, and a capacitive element that can connect to the auxiliary coil. Hereby the contactless power supply device may establish an amount of delay that is suitable for the phase of the current flowing in the switching elements in the power supply circuit with respect to the phase of the voltage applied to the switching elements in the power supply circuit, which supplies alternating-current power to the transmitter coil to improve the power transmission efficiency. Because it is not necessary to raise the Q factor of the resonant circuit in the device on the power receiving side (referred to below as the receiver device), there is no need to include a large coil for power receiving (referred to below as the receiver coil) in the resonant circuit; consequently, this simplifies the contactless power supply device overall.

Figure 1:
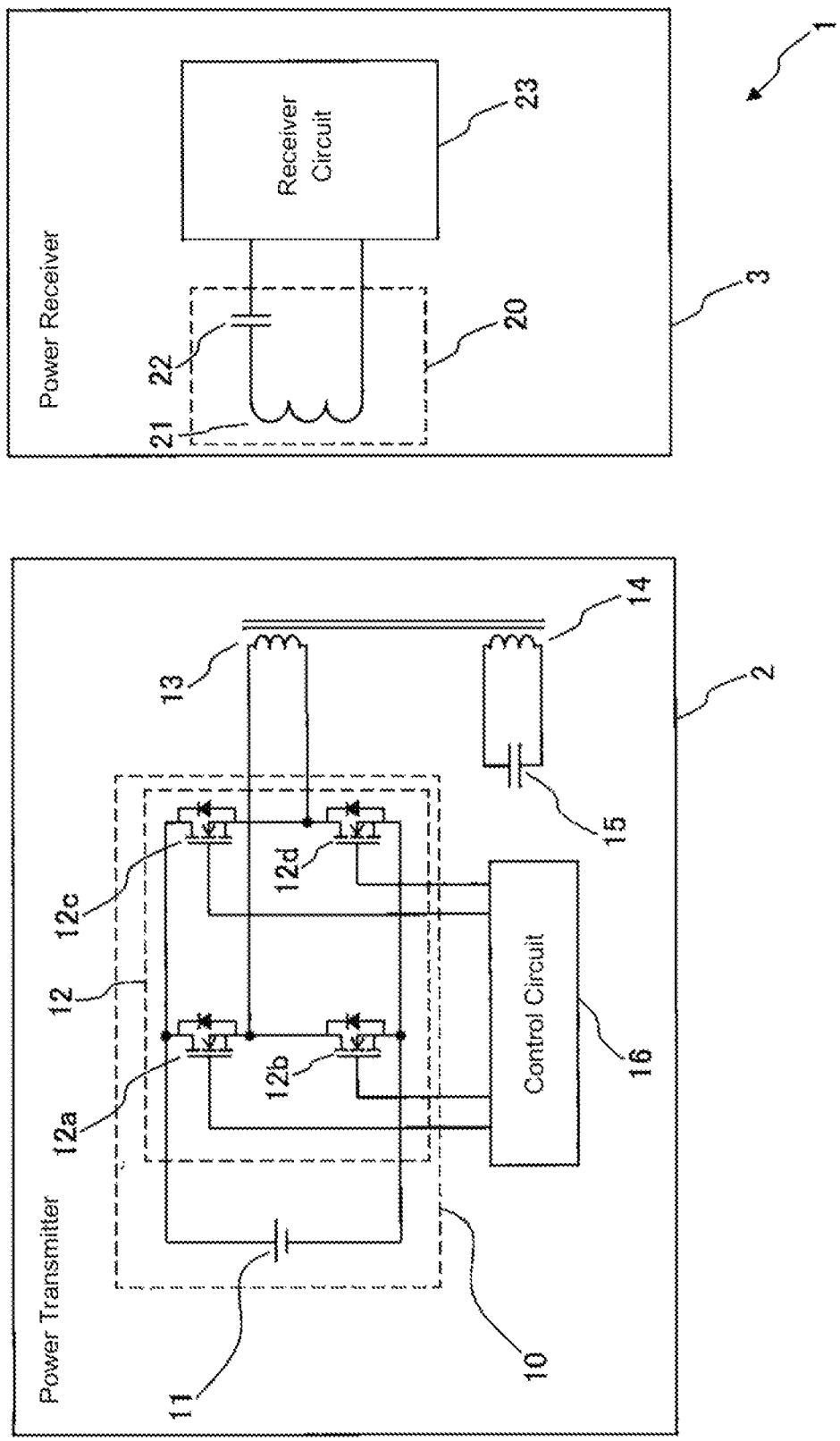
FIG. 1 is a diagram illustrating a schematic overview of a contactless power supply device including a power transmitter according to an embodiment or embodiments.

FIG. 1 is a schematic overview of a contactless power supply device including a power transmitter according to an embodiment; as illustrated in FIG. 1, the contactless power supply device 1 includes a power transmitter 2, and a power receiver 3 to which power is transmitted without contact through the air from the power transmitter 2. The power transmitter 2 includes a power supply circuit 10, a transmitter coil 13, and auxiliary call 14, a capacitor 15, and a control circuit 16. Meanwhile, the power receiver 3 includes a receiver coil 21 and a resonant capacitor 22 which make up the resonant circuit 20, and a receiver circuit 23. The contactless power supply device 1 according to an embodiment transmits power through series resonance (NS method) wherein the resonant circuit 20 on the power receiving side resonates with respect to the alternating-current power supplied to the transmitter coil 13 without employing the resonance on the power transmitting side. The contactless power supply device 1 may transmit power through parallel resonance (NP method) wherein the resonant circuit 20 on the power receiving side resonates with respect to the alternating-current power supplied to the transmitter coil 13 without employing the resonance on the power transmitting side.

First the power transmitter 2 is described. The power supply circuit 10 supplies alternating-current power to the transmitter coil 13. Therefore, the power supply circuit 10 possesses a power source 11, and an inverter circuit 12.

The power source 11 supplies direct-current power. Therefore, the power source 11 may include a full-wave rectifier circuit connected to a commercial alternating-current power source for rectifying the alternating-current power supplied thereto from the alternating-current power source; and a smoothing capacitor for smoothing the ripple current power output from the full-wave rectifier circuit. The power source 11 converts the alternating-current power supplied thereto from the commercial alternating-current power source into direct-current power and outputs the converted direct-current power to the inverter circuit 12. Note that the power source 11 may be a direct-current power source such as a battery.

The inverter circuit 12 converts the direct-current power supplied thereto from the power source 11 into alternating-current power with a predetermined frequency and supplies the converted alternating-current power to the transmitter coil 13. The predetermined frequency may be assumed to be a frequency at which the resonant circuit 20 in the power receiver 3 resonates at an expected coupling coefficient between the transmitter coil 13 and the receiver coil 21. In an embodiment, the inverter circuit 12 is a full-bridge inverter wherein the switching elements 12a-12d are connected in a full bridge configuration. The switching elements may be n-channel MOSFETs.

In other words, among the four switching elements 12a-12d, switching element 12a and switching element 12b are connected in series between the positive terminal side and the negative terminal side of the power source 11. In an embodiment, the switching element 12a is connected to the positive side of the power source 11 while the switching element 12b is connected to the negative side of the power source 11. Similarly, among the four switching elements 12a-12d, switching element 12c and switching element 12d are connected in parallel to switching element 12a and switching element 12b and in series between the positive terminal side and the negative terminal side of the power source 11. The switching element 12c is connected to the positive side of the power source 11 while the switching element 12D is connected to the negative side of the power source 11. I One end of the transmitter coil 13 is connected between the switching element 12a and the switching elements 12b, and the other end of the transmitter coil 13 is connected between the switching elements 12c and the switching element 12d.

Figure 2:
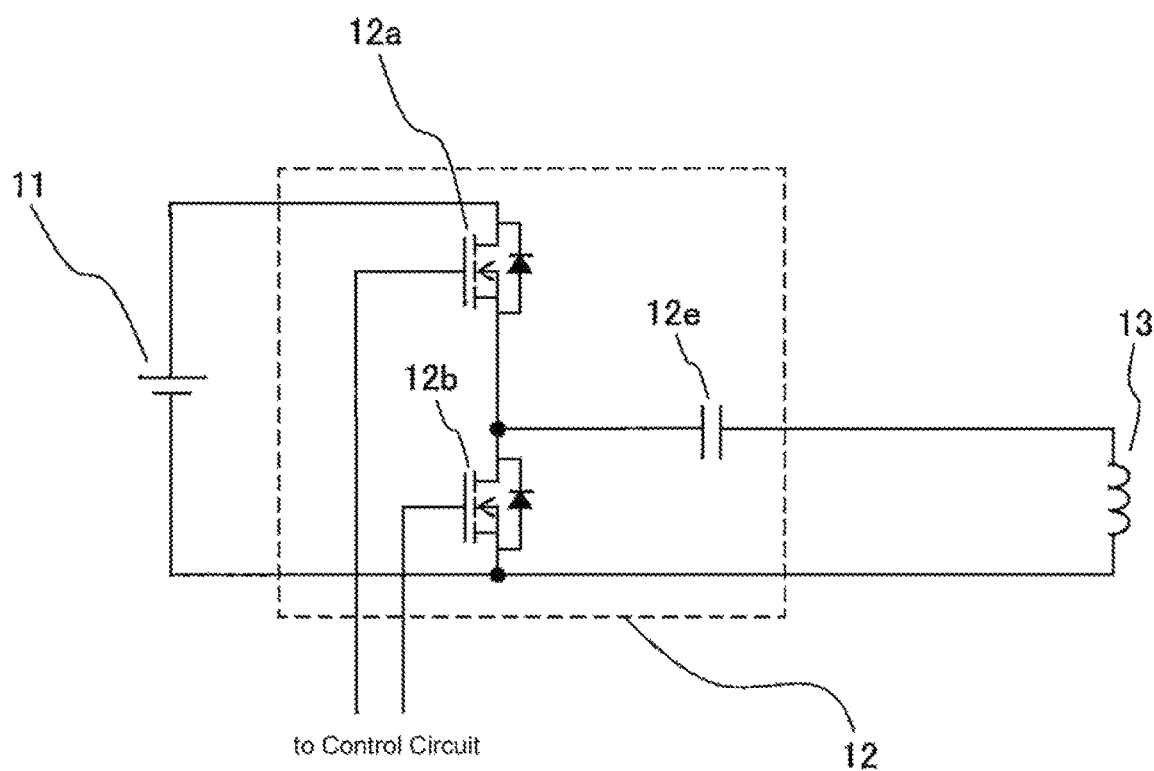
FIG. 2 is a diagram illustrating one example of another inverter circuit.

As illustrated in FIG. 2, the inverter circuit 12 may be a half-bridge inverter wherein two of the switching elements 12a and 12b are connected in a half-bridge configuration with respect to the power source 11. In this case, one end of the transmitter coil 13 is connected between the switching element 12a and switching element 12b via a capacitor 12e while the other ends of the transmitter coil 13 may be connected to ground.

The power transmitter 2 further includes a DC-DC converter (not shown) between the power source 11 in the inverter circuit 12.

The transmitter coil 13 transfers alternating-current power supplied from the power supply circuit 10 to the receiver coil 21 in the power receiver 3 through the air. The power transmitter 2 may include a capacitor connected in series with the transmitter coil 13, between the transmitter coil 13 and the inverter circuit 12 in the power supply circuit 10 for isolating direct-current power.

The auxiliary coil 14 is provided capable of electromagnetic coupling with the transmitter coil 13. Therefore, the auxiliary coil 14 may be wound on the same core as the transmitter coil 13. The number of turns in the auxiliary coil 14 may be same as the number of turns in the transmitter coil 13 or maybe different. The auxiliary coil 14 operates, along with the capacitor 15, from the alternating-current power supplied thereto from the transmitter coil 13 and establishes an amount of delay that is suitable for the phase of the current flowing through the switching elements 12a-12d with respect to the phase of the voltage applied to the switching elements 12a-12d in the inverter 12 of the power supply circuit 10. Hereby, the peak value for the current flowing through the switching elements is close to zero when the switching elements 12a-12d are turned off. This reduces the switching loss in the switching elements 12a-12d.

The capacitor 15 is one example of a capacitive element that holds a predetermined electrostatic charge; the capacitor 15 is connected to the auxiliary coil 14 and along with the auxiliary coil 14 makes up an LC circuit, which is one example of a phase adjusting circuit (referred to below as simply an LC circuit). The LC circuit, that is, the phase adjusting circuit made up of the auxiliary coil 14 and the capacitor 15, establishes an amount of delay that is suitable for the phase of the current flowing through the switching elements with respect to the phase of the voltage applied to the switching elements 12a-12d. Note that the LC circuit, made up of the auxiliary coil 14 and capacitor 15, has a resonance frequency that may be different from the frequency of the alternating-current power supplied to the transmitter coil 13. That is, the LC circuit made up of the auxiliary coil 14 and the capacitor 15 does not need to resonate with respect to the alternating current flowing through the transmitter coil 13.

The control circuit 16 may include a non-volatile memory circuit and a volatile memory circuit; a computation circuit; an interface circuit for connecting to other circuits; and a driving circuit for outputting a control signal to the switching elements 12a-12d in the inverter circuit 12 of the power supply circuit 10. The control circuit 16 controls the switching elements 12a-12d in the inverter circuit 12 so that the frequency of the alternating-current power supply from the power supply circuit 10 to the transmitter coil 13 is a predetermined frequency. As above described, the predetermined frequency may be established as the frequency at which the resonant circuit 20 in the power receiver 3 resonates at an expected coupling coefficient between the transmitter coil 21 and the receiver coil 13.

In an embodiment the control circuit 16 alternates turning on the switching element 12a and the switching element 12d as a set, and the switching element 12b and the switching element 12c as a set. The control circuit 16 may ensure that the period during which the switching element 12a and switching element 12d are on as a set during one cycle equals the period during which the switching element 12b and the switching element 12c are on as a set during one cycle; where, one cycle corresponds to the frequency of the alternating-current power supplied to the transmitter coil 13. Note that preferably, the control circuit 16 prevents the power source 11 from short-circuiting by ensuring that the set which includes the switching element 12a and the switching element 12d is not turned on at the same time as the set which includes the switching element 12b and the switching element 12c. Therefore, the control circuit 16 may establish a dead time where both sets of switching elements are off when changing the set of the switching element 12a and switching element 12d, and the set of the switching element 12b and switching element 12c from the on state to the off state. If, for instance, the inverter circuit 12 is half-bridge inverter as illustrated in FIG. 2, the control circuit 16 may alternately turn on the switching element 12a and the switching element 12b with the frequency of the alternating-current power supplied to the transmitter coil 13.

The power receiver 3 is described next. The receiver coil 21 is made up of a resonant capacitor 22 and the resonant circuit 20, and receives power from the transmitter coil 13 by resonating to the alternating-current flowing in the transmitter coil 13 in the power transmitter 2. In an embodiment, the resonant capacitor 22 is connected in series with the receiver coil 21; however, the resonant capacitor 22 may be connected in parallel with the receiver coil 21. The resonant circuit 20 may include a coil connected in series with the receiver call 21 between the receiver coil 21 and the rectifier circuit in the receiver circuit 23. The alternating-current power output from the resonant circuit 20 is output to the receiver circuit 23. The number of turns in the receiver coil 21 may be the same as the number of turns in the transmitter coil 13 or maybe different.

The receiver circuit 23 converts the alternating-current power from the resonant circuit 20 into direct-current power and the direct-current power is output to a load circuit (not shown) connected to the receiver circuit 23. Therefore, the receiver circuit 23 may include for instance, a full wave rectifier circuit for converting the resonant circuit 20 the alternating-current power from into ripple current power and a smoothing capacitor for smoothing the ripple current output from the full wave rectifier and supplying output to the load circuit.

The relationship between the parameters for the circuit elements in the power transmitter 2 and the coupling coefficient for the coils required for reducing the switching loss in the switching elements of the inverter circuit 12 in the power supply circuit 10 is described below.

In an embodiment, the phase of the current flowing through the transmitter coil 13 lags behind the phase of the voltage supplied to the switching elements of the power supply circuit 10 in the inverter circuit 12 if the coupling coefficient between the transmitter coil 13 and the receiver coil 21 is low, for instance, when the power receiver 3 is too far away to receive power from the power transmitter 2. The situation is the same when the current flowing in the receiver circuit 23 of the power receiver 3 is small. At that point, the inductance in the auxiliary coil 14 and the electrostatic charge in the capacitor 15 is established so that preferably the phase of the current flowing in the LC circuit made up of the auxiliary coil 14 and the capacitor 15 is ahead of the phase of the voltage applied to the switching elements in the power supply circuit 10. Therefore, the inductance in the auxiliary coil 14 and the electrostatic charge in the capacitor 15 are preferably established so that the resonant frequency of the LC circuit is higher than the frequency of the alternating-current power supplied to the transmitter coil 13.

The larger inductance is also preferable in the auxiliary coil 14. This is because the larger the inductance in the auxiliary coil 14 the smaller the current flowing through the LC circuit. The inductance of the auxiliary coil 14 may be established to reduce the current flowing in the LC circuit to less than the excitation current component of the current flowing in the transmitter coil 13, which does not depend on the receiver circuit 23 and the load on the load circuit that can be connected to the resonant circuit 20. That is, the inductance of the auxiliary coil 14 is preferably larger than the value of multiplying the expected maximum value kmax of the coupling coefficient between the transmitter coil 13 and the receiver call 21 by the inductance of the power transmitting side when the transmitter coil 13 and the receiver coil 21 are electromagnetically coupled.

Moreover, the transmitter coil 13 and the auxiliary coil 14 are preferably arranged so that the coupling coefficient between the transmitter coil 13 and the auxiliary coil 14 is higher than a maximum value came Max of the cup the assumed coupling coefficient between the transmitter coil 13 and the receiver coil 21. The transmitter coil 13 and the auxiliary coil 14 may be wound on the same core and the coupling coefficient between the transmitter call 13 on the auxiliary call 14 may be arranged with an interval therebetween to the extent that the coupling coefficient is greater than a maximum value of K max of the cup the assumed coupling coefficient between the transmitter coil 13 and the receiver coil 21. Hereby, the delay of the phase of the current flowing in the transmitter coil is reduced with respect to the phase of the voltage applied to the transmitter quote 13 and as a result, this facilitates reducing the peak value of the current when the switching elements in the inverter circuit 12 are turned off.

Figure 3A:
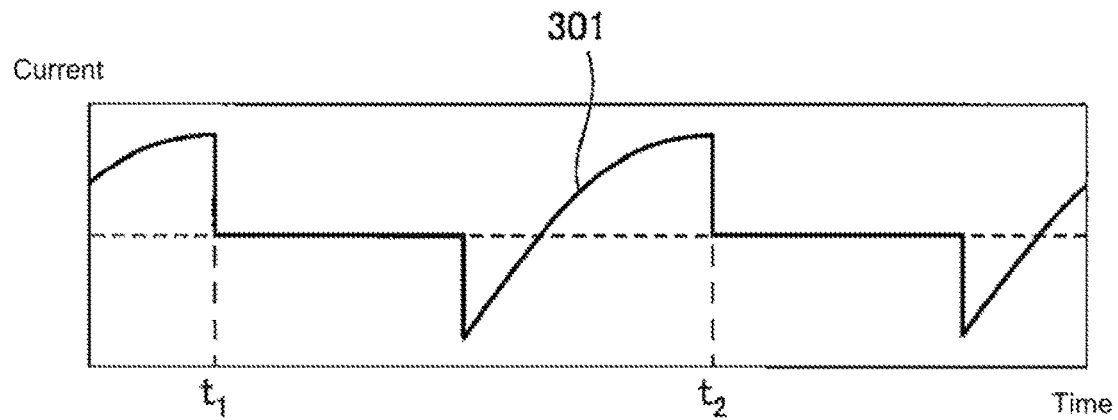
FIG. 3A is a diagram illustrating an example of current flowing through switching elements when the coupling coefficient between a transmitter coil and an auxiliary coil is smaller than the coupling coefficient between the transmitter coil and a receiver coil.
Figure 3B:
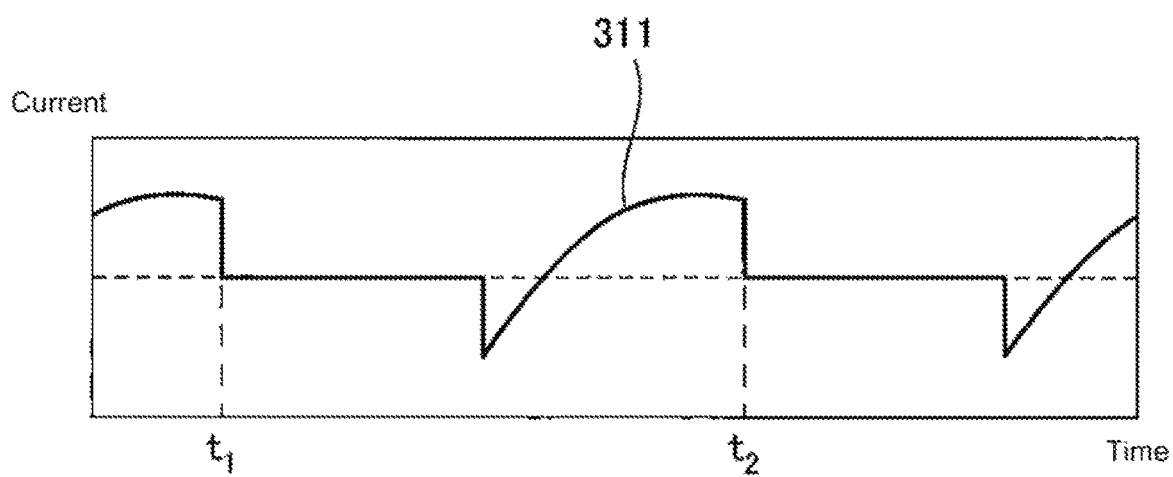
FIG. 3B is a diagram illustrating an example of current flowing through switching elements when the coupling coefficient between a transmitter coil and an auxiliary coil equals the coupling coefficient between the transmitter coil and a receiver coil.

FIG. 3A illustrates an example of the current flowing through the switching elements when the coupling coefficient between the transmitter coil 13 and the auxiliary coil 14 is smaller than the coupling coefficient between the transmitter coil 13 and the receiver coil 21 as determined via simulation; FIG. 3B illustrates an example of the current flowing in the switching elements when the coupling coefficient between the transmitter coil 13 and the auxiliary coil 14 equals the coupling coefficient between the transmitter coil 13 and the receiver coil 21; and FIG. 3C illustrates an example of the current flowing in the switching elements when the coupling coefficient between the transmitter coil 13 and the auxiliary coil 14 is greater than the coupling coefficient between the transmitter coil 13 and the receiver coil 21.

Figure 3C:
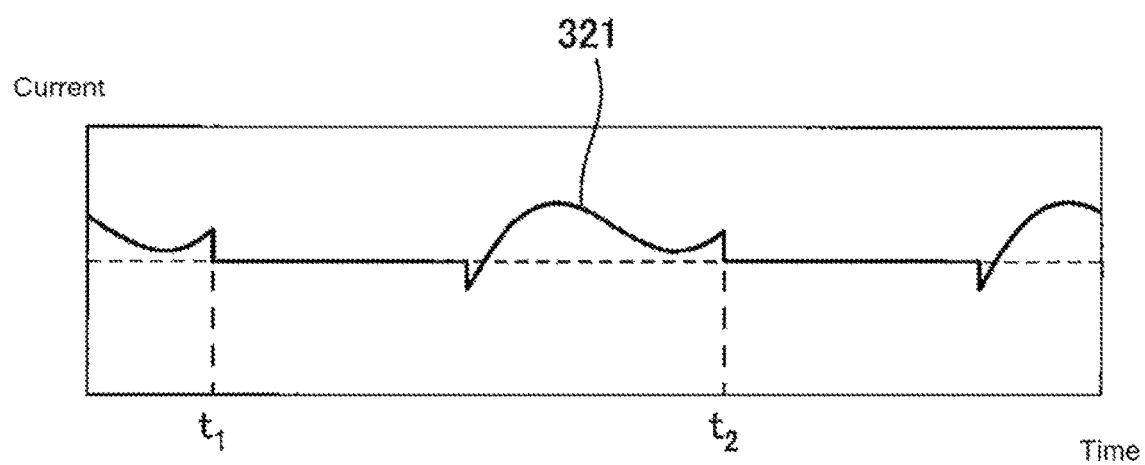
FIG. 3C is a diagram illustrating an example of current flowing in switching elements when the coupling coefficient between a transmitter coil and an auxiliary coil is greater than the coupling coefficient between the transmitter coil and a receiver coil.

The inverter circuit 12 in the simulations depicted in FIG. 3A through FIG. 3C is the half-bridge inverter illustrated in FIG. 2. The inductance in the transmitter coil 13 was 91 μH and the electrostatic charge in the capacitor 12e was 220 nF. The inductance in the auxiliary coil 14 was 100 μH and the electrostatic charge in the capacitor 15 was 30 nF. The inductance in the receiver coil 21 was 121 μH and the electrostatic charge in the resonant capacitor 22 was 60 nF. The resistance value Ro of the load circuit connected to the power receiver 3 was 10Ω. The coupling coefficient k12 between the transmitter coil 13 and the receiver coil 21 was 0.2; the coupling coefficient k13 between the transmitter coil 13 and the auxiliary coil 14 was 0.1; and the coupling coefficient k23 between the auxiliary coil 14 and the receiver coil 21 was 0.2 in the simulation depicted in FIG. 3A. The coupling coefficient k12 between the transmitter coil 13 and the receiver coil 21, the coupling coefficient k13 between the transmitter coil 13 and the auxiliary coil 14, and the coupling coefficient k23 between the auxiliary coil 14 and the receiver coil 21 were all 0.2 in the simulation depicted in FIG. 3B. The coupling coefficient k12 between the transmitter coil 13 and the receiver coil 21 was 0.2 and the coupling coefficient k23 between the auxiliary coil 14 and the receiver coil 21 was 0.2; and the coupling coefficient k13 between the transmitter coil 13 and the auxiliary coil 14 was 0.7 in the simulation depicted in FIG. 3C.

In the graphs in FIG. 3A through FIG. 3C, the horizontal axis represents time and the vertical axis represents the amount of current. The times t1 and t2 represents the timing at which the switching element 12a is turned off. The waveform 301 in FIG. 3A represents the waveform of the current flowing in the switching element 12a when the coupling coefficient k12 is greater than the coupling coefficient k13. Similarly, the waveform 311 in FIG. 3B represents the waveform of the current flowing in the switching element 12a when the coupling coefficient k12 is equal to the coupling coefficient k13. The waveform 321 in FIG. 3C represents the waveform of the current flowing in the switching element 12a when the coupling coefficient k12 is less than the coupling coefficient k13.

As illustrated by the waveforms 301, 311 and 321 it can be understood that the greater the coupling coefficient k13 between the transmitter coil 13 and the auxiliary coil 14 relative to the coupling coefficient k12 between the transmitter coil 13 and the receiver coil 21, the smaller the peak value of the current when the switching elements in the inverter circuit 12 and the RMS value of the current flowing in the switching elements. From this, it can be further understood that it is preferable for the coupling coefficient k13 is greater than the coupling coefficient k12.

As above described, this contactless power supply device includes a transmitter coil in a power transmitter; an auxiliary coil arranged for electromagnetic coupling, and capacitor which, together with the auxiliary coil, creates an LC circuit. Hereby, the contactless power supply device optimizes the amount of delay of the phase of the current flowing in the switching elements with respect to the phase of the voltage applied to the switching elements, which are in an inverter circuit in the power supply circuit that supplies alternating-current power to the transmitter coil. The contactless power supply device is thus capable of reducing the RMS value of the current flowing in the switching elements in the inverter circuit and the peak value of the current flowing in the switching elements when the switching elements are turned off, to thereby reduce the switching loss and the conduction loss in the switching elements. As a result, there is no need for much increase to the Q factor of the receiver coil, which keeps the receiver coil small, and so the contactless power supply device is capable of improving its power transmission efficiency via a simple configuration.

Note that the coupling coefficient between the transmitter coil 13 and the receiver coil 21 may change during power transmission if the power transmitter 2 and the power receiver 3 can move relative to each other during power transmission. If the coupling coefficient between the transmitter coil 13 and the receiver coil 21 change, the amount of delay in the phase of the current flowing in the switching elements with respect to the phase of the voltage applied to the switching elements in the inverter circuit 12 in the power supply circuit 10 fluctuates in accordance with the change.

Therefore, in a modification example, the power transmitter 2 may also include a variable capacitance circuit connected to the auxiliary coil 14, and along with the auxiliary coil 14 makes up an LC circuit. The control circuit 16 in the power transmitter 2 controls the electrostatic charge in the variable capacitance circuit in accordance with the current flowing in any of the switching elements in the inverter circuit 12 in the power supply circuit 10. The control circuit 16 thus suitably controls the amount of delay in the phase of the current flowing in the switching elements with respect to the phase of the voltage applied to the switching elements in the inverter circuit 12 in the power supply circuit 10.

Figure 4:
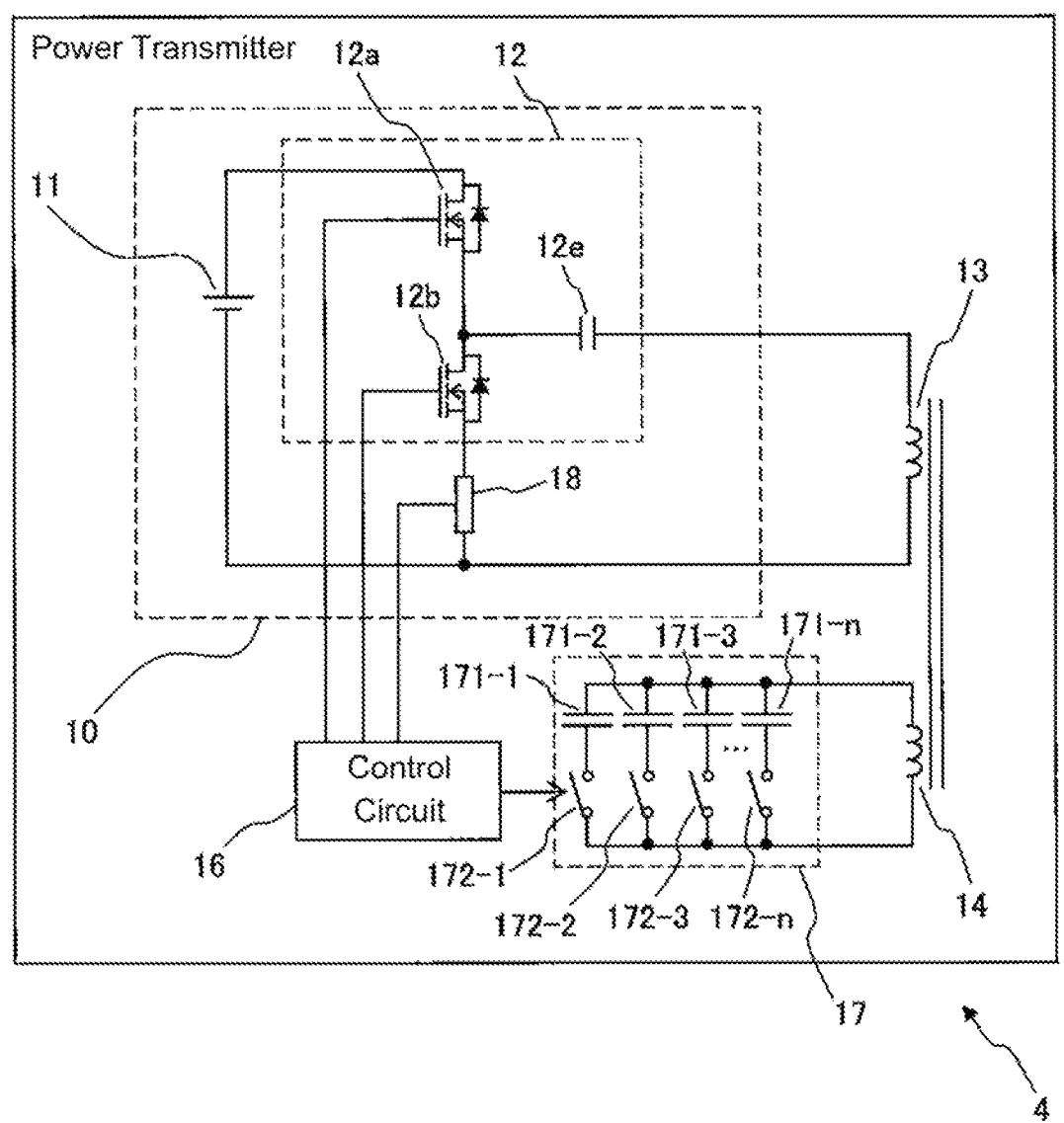
FIG. 4 is a diagram schematically illustrating the configuration of a power transmitter in accordance with a modification example.

FIG. 4 schematically illustrates the configuration of a power transmitter 4 in accordance with a modification example. Compared to the power transmitter 2 of the above embodiment, the power transmitter 4 according to this modification example possesses a variable capacitance circuit 17 instead of the capacitor 15; the power transmitter 4 also includes a current detection circuit 18 for detecting the current flowing through any one of the switching elements in the inverter circuit 12. The control circuit 16 in this modification example further controls the electrostatic charge in the variable capacitance circuit 17 in accordance with a measurement value for the amount of current detected by the current detection circuit 18. For that reason, the variable capacitance circuit 17, the current detection circuit 18, and the control of the electrostatic charge in the variable capacitance circuit 17 by control circuit 16 is described below. It is sufficient to refer to the corresponding components of the power transmitter 2 of the above-described embodiment for a description of the other elements in the overall configuration of the power transmitter 4.

The variable capacitance circuit 17, another example of a capacitive element, along with the auxiliary coil 14 constitutes an LC circuit. The variable capacitance circuit 17 has an electrostatic charge that can be adjusted. Therefore, the variable capacitance circuit 17 includes a plurality of capacitors 171-1-171-$n$ (where n is an integer greater than or equal to 2) which are mutually connected in parallel to the auxiliary coil 14, and a plurality of switching elements 172-1-172-$n$. The capacitor 171-$k$ (where k=1, 2, ..., n) and the switching element 172-$k$ are connected in series. Any of the plurality of capacitors 171-1-171-$n$ may be connected to the auxiliary coil 14 without being connected thereto through a switching element.

The plurality of switching elements 172-1-172-$n$ may be a relay or an n-channel MOSFET. If the switching elements are n-channel MOSFETs, the drain terminal of the switching elements is connected to one end of the auxiliary coil 14 via the corresponding capacitor, and the source terminal of the switching elements is connected to the other end of the auxiliary coil 14. The gate terminal of the switching elements is connected to the control circuit 16.

Each switching element of the plurality of switching elements 172-1-172-$n$ is turned off or turned on by the control circuit 16. The plurality of capacitors 171-1-171-$n$ connected in series with the switching elements that are turned on contribute to the operation of the LC circuit. That is, the electrostatic charge of the variable capacitance circuit 17 increases as the number of switching elements turned among the plurality of switching elements 172-1-172-$n$ increases. Accordingly, the RMS value of the current flowing in the LC circuit increases. The phase of the current flowing in the LC circuit advances relative to the phase of the voltage applied to the transmitter coil 13; therefore, the current flowing in the LC circuit has a larger effect on the phase of the current flowing in the inverter circuit 12 in the power supply circuit 10 by the extent of the increase in the RMS value of current flowing in the LC circuit. As a result, this reduces the amount of delay in the phase of the current flowing in the switching elements with respect to the phase of the voltage applied the switching elements in the inverter circuit 12.

The current detection circuit 18 measures the amount of current flowing in any of the switching elements 12$a$-12$d$ in the inverter circuit 12 in the power supply circuit 10. The current detection circuit 18 may be configured from any of the various kinds of known current detection circuits capable of measuring direct current. In an embodiment, the current detection circuit 18 is connected between the source terminal of the switching element 12$b$ and the negative terminal side of the power source 11. The current detection circuit 18 measures the amount of current flowing in the switching element 12$b$ and outputs a signal to the control circuit 16 representing the amount of current measured. Note that the current detection circuit 18 is connected between the drain terminal of the switching element 12$a$ and the positive terminal side of the power source 11, and may measure the current flowing in the switching element 12$a$.

The control circuit 16 controls the electrostatic charge in the variable capacitance circuit 17 on the basis of the measurement value measured by the current detection circuit 18 for the amount of current flowing in any of the switching elements in the inverter circuit 12. In an embodiment, the control circuit 16 controls the electrostatic charge in the variable capacitance circuit 17 on the basis of the measurement value for the amount of current at time the switching element 12$b$ is turned on.

Figure 5:
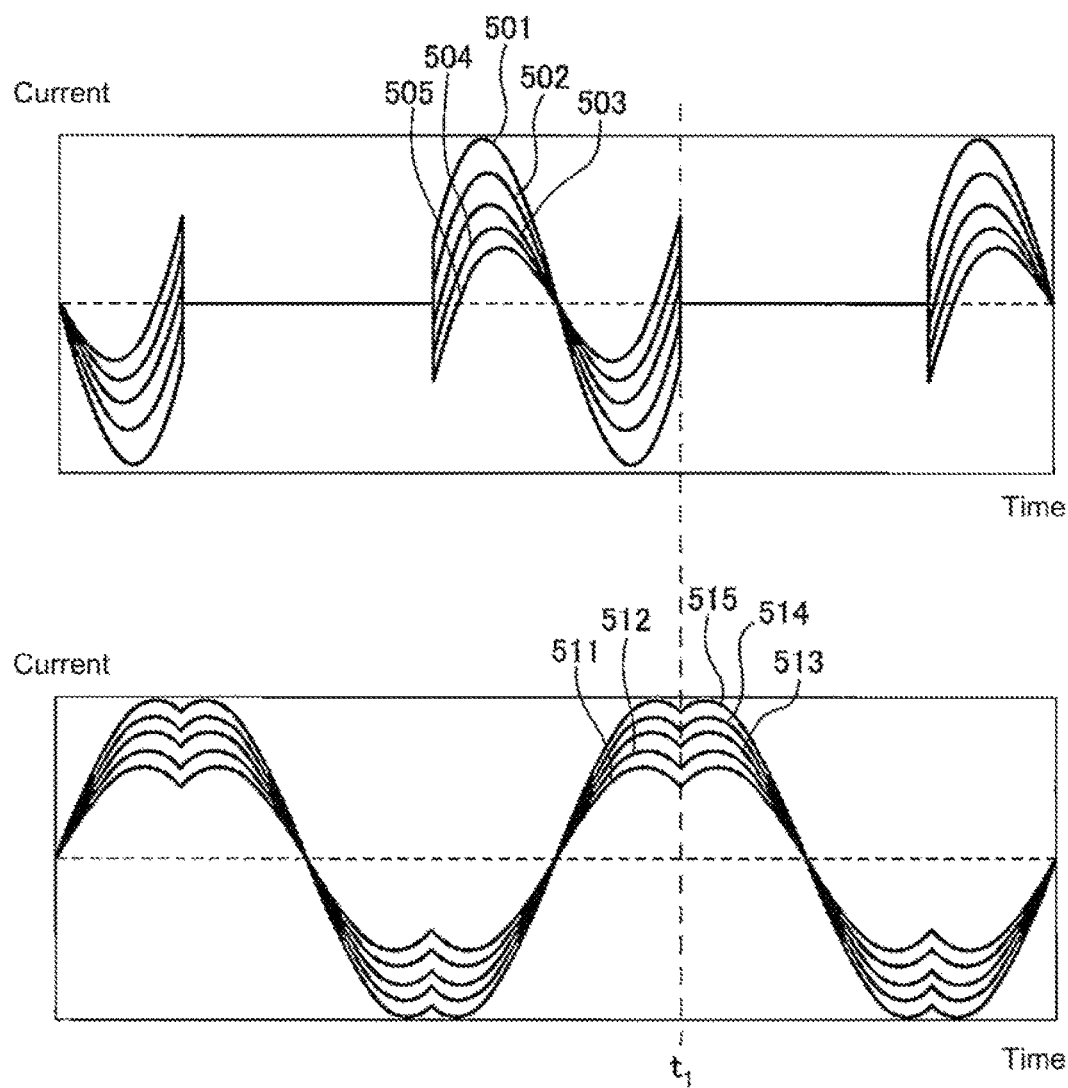
FIG. 5 is a diagram illustrating one example of the relationship between the electrostatic capacity in a variable capacitance circuit, and current flowing in switching elements in an inverter circuit and current flowing through an auxiliary coil as determined via simulation.

FIG. 5 illustrates one example of the relationship between the electrostatic charge in the variable capacitance circuit 17, and the current flowing in the switching elements in the inverter circuit 12 and the current flowing through the auxiliary coil 14 as determined via simulation. The parameter values for the circuit elements in the simulation depicted in FIG. 5 are identical to the parameter values in the simulations depicted in FIG. 3A through FIG. 3C except for the circuit elements related to the electrostatic charge in the variable capacitance circuit 17. The coupling coefficient between the transmitter coil 13 and the receiver coil 21 and the coupling coefficient between the auxiliary coil 14 and the receiver coil 21 are 0.2, while the coupling coefficient between the transmitter coil 13 and the auxiliary coil 14 is 0.7.

In the graphs in FIG. 5, the horizontal axis represents time and the vertical axis represents the amount of current. Additionally, the time t1 represents the timing at which the switching element 12b is turned on. Each waveforms 501-505 presented in the upper graph represents the current flowing in the switching element 12b when the electrostatic capacity in the variable capacitance circuit 17 is increased sequentially by 2 nF from 30 nF. Each of the waveforms 511-515 in the lower graph represents the current flowing through the auxiliary coil 14 when the electrostatic capacity in the variable capacitance circuit 17 is increased sequentially by 2 nF from 30 nF.

As illustrated by the waveforms 501-505, when the switching element 12b is turned off, the peak value of the current flowing through the switching element 12b decreases by the extent of the increase in electrostatic charge in the variable capacitance circuit 17. Meanwhile, as illustrated by the waveforms 511-515, the RMS value of the current flowing in the auxiliary coil 14 rises by the extent of the increase in the electrostatic charge in the variable capacitance circuit 17.

At that point the control circuit 16 controls the variable capacitance circuit 17 to turn on any of the plurality of switching elements 172-1-172-n therein in the off state if, when any of the switching elements in the inverter circuit 12 is turned off (e.g., the switching element 12b where the amount of current is being measured), the measurement value for the amount of current detected by the current detection circuit 18 exceeds a predetermined upper limit threshold. The electrostatic charge in the variable capacitance circuit 17 thus increases, and as a result, when the switching elements in the inverter circuit 12 are turned off, the peak value of the current flowing in the switching elements decreases and reduces the switching loss.

At the same time, the control circuit 16 controls the variable capacitance circuit 17 to turn off any of the plurality of switching elements 172-1-172-n in the variable capacitance circuit 17 that is in the on state if the measurement value for the amount of current detected by the current detection circuit 18 is less than the aforementioned upper limit threshold when any of the switching elements in the inverter circuit 12 is turned off. The electrostatic charge in the variable capacitance circuit 17 thus decreases, and as a result the RMS value of the current in the auxiliary coil 14 decreases to reduce the conduction loss due to the LC circuit which includes the auxiliary coil 14.

As above described, according to this modification example, the contactless power supply device controls the electrostatic charge in a variable capacitance circuit constituted by an LC circuit in accordance with the current flowing in the switching elements making up the inverter circuit in the power supply circuit. Therefore, a contactless power supply device according to the modification example is capable of maintaining an amount of delay that is suitable for the phase of the current flowing in the switching elements with respect to the phase of the voltage applied to the switching elements in the inverter circuit even when the coupling coefficient between the transmitter coil and the receiver coil varies; consequently, this reduces the switching loss in the switching elements and the conduction loss in the LC circuit.

The current detection circuit 18 may be connected between the auxiliary coil 14 and the variable capacitance circuit 17 in this modification example, and be configured to obtain a measurement value for the amount of current flowing in the auxiliary coil 14, and output the measurement value for the amount of current to the control circuit 16. In this case the control circuit 16 may control the electrostatic charge in the variable capacitance circuit 17 in accordance with the amount of current flowing in the auxiliary coil 14 when any of the switching elements in the inverter circuit 12 is turned off. As illustrated in FIG. 5, when the switching elements in the inverter circuit 12 are turned off, the RMS value of the current flowing in the auxiliary coil 14 rises and the peak value of the current flowing in the switching elements decreases by the extent of the increase in the electrostatic charge in the variable capacitance circuit 17. Therefore, the control circuit 16 may control the variable capacitance circuit 17 to turn on any of the plurality of switching elements 172-1-172-n in the variable capacitance circuit 17 that are in the off state if, when any of the switching elements in the inverter circuit 12 are turned off, the current detection circuit 18 obtains a measurement value for the amount of current flowing in the auxiliary coil 14 that is within a predetermined lower limit threshold. The electrostatic charge in the variable capacitance circuit 17 thus increases, and as a result, when the switching elements in the inverter circuit 12 are turned off, the peak value of the current flowing in the switching elements decreases and reduces the switching loss.

Meanwhile, the control circuit 16 may control the variable capacitance circuit 17 to turn on any of the plurality of switching elements 172-1-172-n therein in the off state if, when any of the switching elements in the inverter circuit 12 are turned off, the current detection circuit 18 obtains a measurement value for the amount of current flowing in the auxiliary coil 14 that exceeds a predetermined upper limit threshold that is greater than the predetermined lower limit threshold. The electrostatic charge in the variable capacitance circuit 17 thus decreases, and as a result the RMS value of the current in the auxiliary coil 14 decreases to reduce the conduction loss due to the LC circuit which includes the auxiliary coil 14.

Moreover, in the above modification example a control circuit may be established for controlling the electrostatic charge of the variable capacitance circuit 17 separately from the control circuit 16 which controls the inverter circuit 12. Here, the control circuit 16 may notify the control circuit for controlling the electrostatic charge of the variable capacitance circuit 17 of the timing at which any of the switching elements in the inverter circuit 12 are turned off. The control circuit for controlling the electrostatic charge of the variable capacitance circuit 17 may thus identify the measurement value for the amount of current flowing in the auxiliary coil 14 when any of the switching elements in the inverter circuit 12 is turned off.

A person having ordinary skill in the art may make various modifications in the above manner within the scope of the invention in accordance with how the device will be used.

The invention claimed is:

1. A contactless power supply device comprising:
   a power transmitter; and
   a power receiver configured to accept a power transmission from the power transmitter without contact;
   the power transmitter comprising:
   a transmitter coil configured to supply power to the power receiver via a receiver coil in the power receiver;
   a power supply circuit comprising a power source configured to supply direct-current power, and a plurality of switching elements connected in a full-bridge or half-bridge configuration between the power source and the transmitter coil; the plurality of switching elements switching between on and off states at a predetermined frequency to thereby convert the direct-current power supplied by the power source into alternating-current power of a predetermined frequency which is supplied to the transmitter coil;

an auxiliary coil configured to electromagnetically couple with the transmitter coil; and a capacitive element configured to connect to the auxiliary coil.

2. The contactless power supply device according to claim 1, wherein a coupling coefficient between the transmitter coil and the auxiliary coil is greater than a maximum value expected of a coupling coefficient between the transmitter coil and the receiver coil.

3. The contactless power supply device according to claim 2, wherein the capacitive element is configured adjust an electrostatic charge in the capacitive element, and the power transmitter further comprises:

a current detection circuit configured to obtain a measurement value for an amount of current flowing in any of the plurality of switching elements in the power supply circuit; and a control circuit configured to control the electrostatic charge in the capacitive element in accordance with the obtained measurement value for the amount of current flowing in any of the plurality of switching elements in the power supply circuit, in response to any one of the plurality of switching elements in the power supply circuit being turned off.

4. The contactless power supply device according to claim 3, wherein the control circuit controls the capacitive element to cause the electrostatic charge in the capacitive element to increase in response to the obtained measurement value for the amount of current flowing in any of the plurality of switching elements in the power supply circuit, exceeding a predetermined upper limit threshold.

5. The contactless power supply device according to claim 4, wherein the control circuit controls the capacitive element to cause the electrostatic charge in the capacitive element to decrease in response to the obtained measurement value for the amount of current flowing in any one of the plurality of switching elements in the power supply circuit being, being less than a predetermined lower limit threshold that is lower than the predetermined upper limit threshold.

6. The contactless power supply device according to claim 2, wherein the capacitive element is configured to adjust an electrostatic charge in the capacitive element, and the power transmitter further comprises:

a current detection circuit configured to obtain a measurement value for an amount of current flowing in the auxiliary coil; and a control circuit configured to control the electrostatic charge in the capacitive element in accordance with the obtained measurement value for the amount of current flowing in the auxiliary coil, in response to any one of the plurality of switching elements in the power supply circuit being turned off.

7. The contactless power supply device according to claim 1, wherein the capacitive element is configured to adjust an electrostatic charge in the capacitive element, and the power transmitter further comprises:

a current detection circuit configured to obtain a measurement value for an amount of current flowing in any of the plurality of switching elements in the power supply circuit; and a control circuit configured to control the electrostatic charge in the capacitive element in accordance with the obtained measurement value for the amount of current flowing in any of the plurality of switching elements in the power supply circuit, in response to any one of the plurality of switching elements in the power supply circuit being turned off.

8. The contactless power supply device according to claim 7, wherein the control circuit controls the capacitive element to cause the electrostatic charge in the capacitive element to increase in response to the obtained measurement value for the amount of current flowing in any of the plurality of switching elements in the power supply circuit exceeding a predetermined upper limit threshold.

9. The contactless power supply device according to claim 8, wherein the control circuit controls the capacitive element to cause the electrostatic charge in the capacitive element to decrease in response to the obtained measurement value for the amount of current flowing in any one of the plurality of switching elements in the power supply circuit being less than a predetermined lower limit threshold that is lower than the predetermined upper limit threshold.

10. The contactless power supply device according to claim 1, wherein the capacitive element is configured to adjust an electrostatic charge in the capacitive element, and the power transmitter further comprises:

a current detection circuit configured to obtain a measurement value for an amount of current flowing in the auxiliary coil; and a control circuit configured to control the electrostatic charge in the capacitive element in accordance with the obtained measurement value for the amount of current flowing in the auxiliary coil, in response to any one of the plurality of switching elements in the power supply circuit being turned off.

11. A power transmitter configured for transmitting power to a power receiver without contact, the power transmitter comprising:

a transmitter configured to supply power to the power receiver via a receiver coil in the power receiver;

a power supply circuit comprising a plurality of switching elements connected in a full-bridge or half-bridge configuration between a power source for supplying direct-current power and the transmitter coil; the plurality of switching elements switching between on and off states at a predetermined frequency to thereby convert the direct-current power supplied by the power source into alternating-current power of a predetermined frequency which is supplied to the transmitter coil;

an auxiliary coil configured to electromagnetically couple with the transmitter coil; and a capacitive element configured to connect to the auxiliary coil.

* * * * *